(12) United States Patent
Taura

(10) Patent No.: US 6,642,957 B1
(45) Date of Patent: Nov. 4, 2003

(54) COLOR SIGNAL PROCESSING CIRCUIT, METHOD OF THE SAME AND A CAMERA APPARATUS

(75) Inventor: Yoshihiro Taura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/181,184

(22) Filed: Oct. 28, 1998

(30) Foreign Application Priority Data

Oct. 29, 1997 (JP) .............................................. 9-297421

(51) Int. Cl.$^7$ ................................................ H04N 9/73
(52) U.S. Cl. ..................................... 348/223.1; 348/655
(58) Field of Search .......................... 348/223.1, 225.1, 348/228.1, 655

(56) References Cited

U.S. PATENT DOCUMENTS

| | | | | |
|---|---|---|---|---|
| 4,797,733 A | * | 1/1989 | Takagi et al. | 348/225 |
| 5,471,241 A | * | 11/1995 | Hieda | 348/222 |
| 5,581,298 A | * | 12/1996 | Sasaki et al. | 348/223 |
| 5,589,879 A | * | 12/1996 | Saito et al. | 348/223 |
| 6,108,037 A | * | 8/2000 | Takei | 348/655 |

* cited by examiner

Primary Examiner—Wendy R. Garber
Assistant Examiner—Jason Whipkey
(74) Attorney, Agent, or Firm—Frommer Lawrence & Haug LLP; William S. Frommer; Gordon Kessler (57) ABSTRACT

A color signal processing circuit comprising an amplification circuit having three gains for amplifying a color signal of red, green and blue color signals and amplifying the red, green and blue color signals, the red, green and blue color signals being generated from an image signal taken by a solid-state imaging device by a color separation; a pull-in determination circuit for judging whether or not the color signal in a two dimensional coordinates for defining the color is positioned within a first pull-in limit region showing a color adjustment region and a second pull-in limit region defined in the first pull-in limit region and contained an origin of the two dimensional coordinates, and determinating the pull-in of a color shown by the color signal into a white color defined as the origin of the two dimensional coordinates; and a gain adjustment circuit for adjusting the gain of the amplification circuit, to thereby pull-in the color shown by the color signal determined the pull-in into the origin of the two dimensional coordinates.

27 Claims, 11 Drawing Sheets

COLOR SIGNAL PROCESSING CIRCUIT, METHOD OF THE SAME AND A CAMERA APPARATUS

BACKGROUND OF THE INVENTION

1. Field of the Invention

The present invention relates to a color signal processing apparatus, a method of the same and a camera apparatus which perform a white balance processing of a color signal of an image taken by a solid-state imaging device such as a charge coupled device (CCD).

2. Description of the Related Art

When taking an image by using a solid-state imaging device such as a CCD, a white color in an objective image becomes reddish in results of the image taken under an environment of low color temperature like at indoors, while it becomes bluish in results of the image taken under an environment of high color temperature like at outdoors.

The color temperature here is defined as a temperature of blackbody (K) having the same chrominance as a light source for a test.

Figure 1A:
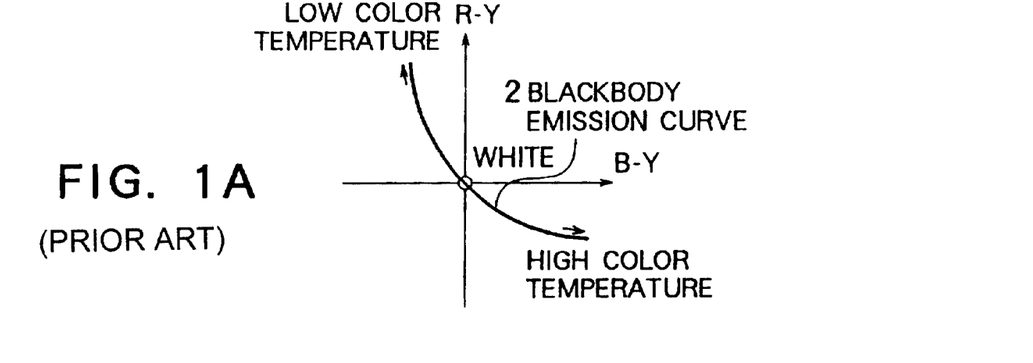
FIGS. 1A to 1C are views for explaining a pull-in limit region in a camera apparatus of the related art.

When using a camera apparatus employing such a solid-state imaging device to reproduce a white color from the objective image to appear as an achromatic color in the reproduced image, if the color temperature of the light source changes, the input color white moves along a blackbody emission curve (blackbody locus 2) in accordance with changes of a color temperature as shown in FIG. 1A. In this case, an automatic white balance (AWB) processing is performed to match a white portion of the objective image, that appears to be colored because of the color temperature changes of the light source, to an achromatic white color of a reproduced image.

In the automatic white balance processing, in order to remain the colors as they are for the portions originally not being white, it is necessary to prevent erroneously performing white balance processing to any color that was not white in the original objective image. Therefore, a camera apparatus sets a pull-in limit region 3, shown in FIG. 1B, which limits a range the white balance operation is performed. The white balance processing is performed only when white color is positioned within the pull-in limit region 3, while the white balance operation is not performed when it is positioned outside the region 3.

Figure 1B:
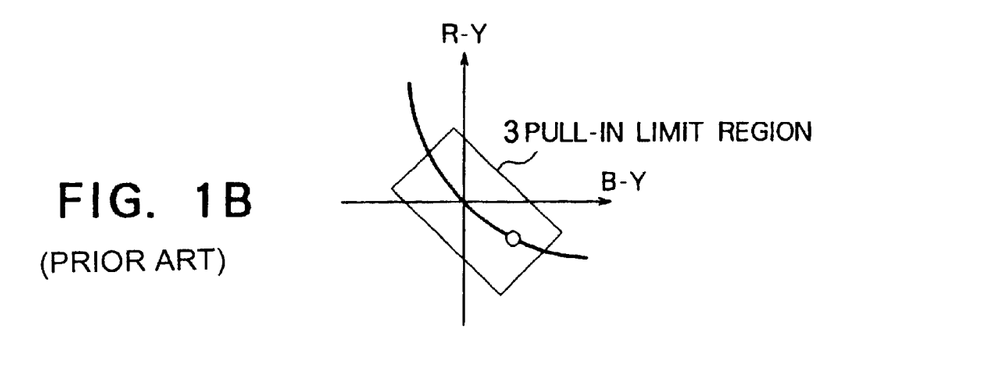

Conventionally, the pull-in limit region 3 is set to be a simple rectangular shape, as shown in FIG. 1B. As a result, a program volume for processing the white balance can be reduced compared with a case with a complex shape.

Figure 1C:
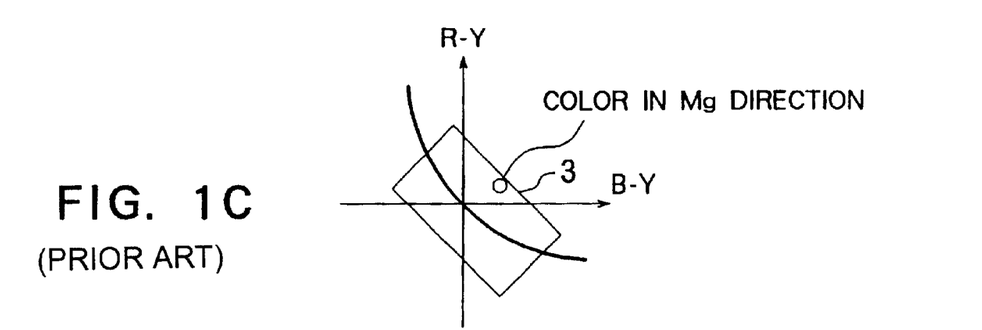

However, when using the rectangular pull-in limit region 3 as shown in FIG. 1B for the automatic white balance processing in the same way as the above camera apparatus, the automatic white balance processing is performed with respect to colors outside the changing direction of the color temperature being along with the blackbody emission curve 2, as shown in FIG. 1C, and the colors are made to be different from the original. In an example shown in FIG. 1C, the automatic white balance processing is performed to magenta (Mg).

Figure 2A:
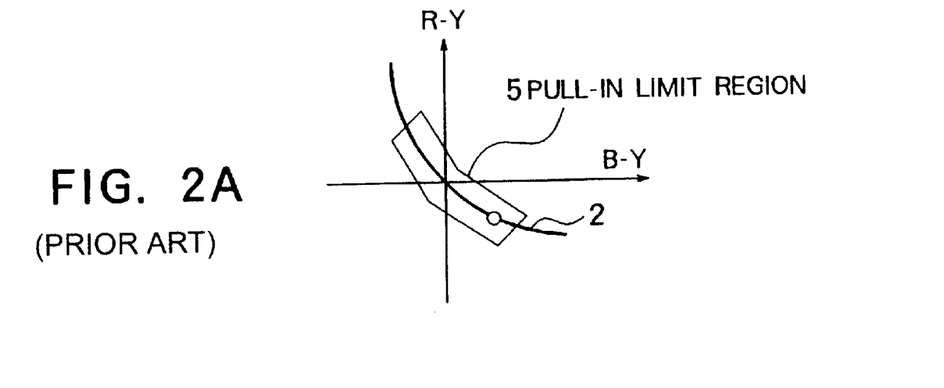
FIGS. 2A to 2C are views for explaining another pull-in limit region in a camera apparatus of the related art.
Figure 2B:
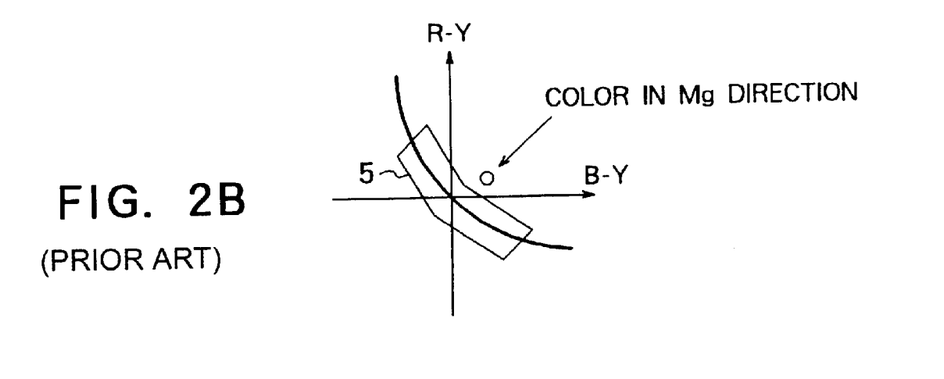

To overcome the disadvantage, when using a pull-in limit region 5 which is combination of a plurality of rectangles to be along with the blackbody emission curve 2, as shown in FIG. 2A, the automatic white balance processing is not performed to colors outside the change direction of the color temperature along with the blackbody emission curve 2, and, for example, magenta can be remained as it is, as shown in FIG. 2B.

Figure 2C:
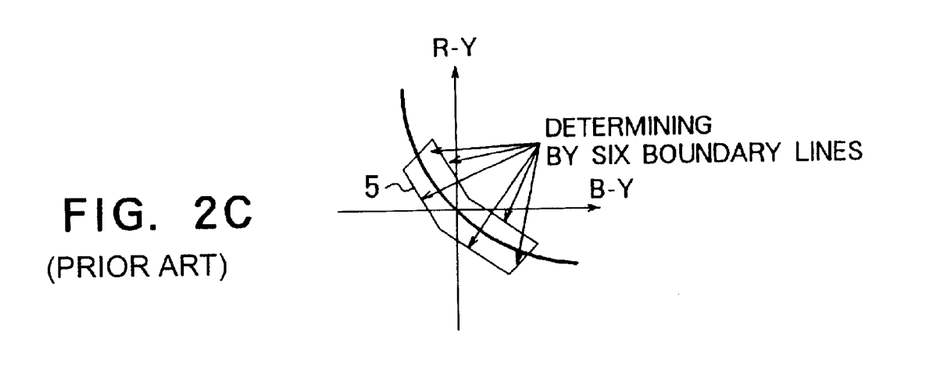

However, in the methods shown in FIGS. 2A to 2C, the pull-in limit region 5 has six boundary lines, as shown in FIG. 2C, so that when judging if the objective color is inside the pull-in limit region 5 or outside, it is necessary to judge that on which side the objective color is positioned with respect to six boundary lines. Therefore, there is a disadvantage that a volume of the program to perform the automatic white balance processing becomes large and the processing time becomes long.

Another methods can be considered which stores all the combinations of R gain and B gain being positioned at predetermined intervals on the blackbody emission curve, judges if an objective color is one of the stored combinations or not, and determines whether or not to perform the automatic white balance processing. In this methods, more highly precise automatic white balance processing can be realized, however, as same as the case in FIGS. 2A to 2C, there is a disadvantage that the program volume is large and the processing time is long.

SUMMARY OF THE INVENTION

An object of the present invention is to provide a color signal processing circuit, a method of the same and a camera apparatus, which can perform a highly precise automatic white balance processing with a small program volume.

According to the present invention, there is provided a color signal processing circuit comprising: an amplification circuit having three gains for amplifying a color signal of red, green and blue color signals and amplifying the red, green and blue color signals, the red green and blue color signals being generated from an image signal taken by a solid-state imaging device by a color separation; a pull-in determination circuit for judging whether or not the color signal in a two dimensional coordinates for defining the color is positioned within a first pull-in limit region showing a color adjustment region and a second pull-in limit region defined in the first pull-in limit region and contained an origin of the two dimensional coordinates, and determinating the pull-in of a color shown by the signal into a white color defined as the origin of the two dimensional coordinates; and a gain adjustment circuit for adjusting the gain of the amplification circuit, to thereby pull-in the color shown by the color signal determined the pull-in into the origin of the two dimensional coordinates.

Preferably, the color signal processing circuit further comprises an integration circuit for integrating the color signal to generate an integrated color signal.

The pull-in determination circuit judges whether or not the integrated color signal in the two dimensional coordinates is positioned within the first pull-in limit region and the second pull-in limit region, and determines the pull-in of a color shown by the integrated color signal into the white color defined as the origin of the two dimensional coordinates. The gain adjustment circuit adjusts the gain of the amplification circuit, to thereby pull-in the color shown by the integrated color signal determined the pull-in into the origin of the two dimensional coordinates.

Preferably, the integration circuit integrates the color signal, every field to generate the integrated color signal.

The two dimensional coordinates may be defined by a first axis showing (R+B−2G), where R represents red, B represents blue and G represents green, and a second axis showing (R-B).

Preferably the integration :circuit integrates an (R-G) color signal and a (B-G) color signal every field to generate an (R-G) integrated color signal every field and a (B-G)

integrated color signal. The pull-in determination circuit calculates the (R-G) integrated color signal and the (B-G) integrated color signal to obtain an (R-B) integrated color signal and an (R+B–2G) integrated color signal, and judges whether or not the (R-B) integrated color signal and the (R+B–2G) integrated color signal in the two dimensional coordinates for defining the color is positioned within the first pull-in limit region and the second pull-in limit region, and determines the pull-in of a color shown by the integrated color signal into the white color defined as the origin of the two dimensional coordinates. The gain adjustment circuit adjusts the gain of the amplification circuit to thereby pull-in the color shown by the integrated color signal into the origin of the two dimensional coordinates.

The first pull-in limit region is defined as a first rectangular shape which are defined by first to fourth lines, the first and second lines being parallel to each other and being positioned both sides of a blackbody emission curve in the two dimensional coordinates and passing the origin, and the third and fourth lines being parallel to each other and perpendicular to the first and second lines, and the second pull-in limit region is defined as a second rectangular shape and is smaller than the first pull-in limit region, the second rectangular shape being defined by fifth to eighth lines, the fifth and sixth lines being parallel to each other and to the first and second lines of the first pull-in limit region, and being respectively positioned between the first line and the blackbody emission curve and between the blackbody emission curve and the second line, the seventh and eighth lines being parallel to each other and perpendicular to the fifth and sixth lines, the fifth line of a upper position being defined as a first reference line and the sixth line of a lower position being defined as a second reference line.

The color shown by the color signal may be varied to another color shifted from the white color along a blackbody emission curve in the two dimensional coordinates in response to the change of a color temperature.

Alternatively, the color shown by the integrated color signal may be varied to another color shifted from the white color along the blackbody emission curve in the two dimensional coordinates in response to the change of a color temperature. The first and second lines defining the first pull-in limit region are parallel to a tangential line of the blackbody emission curve at the origin.

Preferably, the solid-state imaging device is a charge coupled device.

In the color signal processing circuit of the present invention, only when two dimensional coordinates of the color signal is positioned inside the first pull-in limit region in the two dimensional coordinates and also is positioned inside the second pull-in limit region, the processing for pulling in the color indicated by the color signal to the origin is performed.

The second pull-in limit region is closer to the blackbody emission curve compared with the first pull-in limit region. Therefore, compared with the case only using the first pull-in limit region, it can prevented to pull in colors other than white to white more correctly.

According to the present invention, there is also provided a method for processing a color signal, including the steps of: amplifying a color signal of red, green and blue color signals by an amplification circuit having three gains for amplifying the red, green and blue color signals, the red, green and blue color signals being generated from an image signal taken by a solid-state imaging device by a color separation; judging whether or not the color signal in a two dimensional coordinates for defining the color is positioned within a first pull-in limit region showing a color adjustment region and a second pull-in limit region defined in the first pull-in limit region and contained an origin of the two dimensional coordinates, and determinating the pull-in of a color shown by the color signal into a white color defined as the origin of the two dimensional coordinates; and adjusting the gain of the amplification circuit, to thereby pull-in the color shown by the color signal determined the pull-in into the origin of the two dimensional coordinates.

According to the present invention, there is further provided a camera apparatus comprising: an imaging means including a plurality of solid-state imaging devices for generating an analog image signal of an object; an A/D converter converting the analog image signal to a digital image signal; a primary-color separation circuit for separating the digital converted image signal to a red (R) color signal, a green (G) color signal and a blue (B) color signal; an amplification circuit having three gains for amplifying a color signal of red, green and blue color signals and amplifying the red, green and blue color signals; a pull-in determination circuit for judging whether or not the color signal in a two dimensional coordinates for defining the color is positioned within a first pull-in limit region showing a color adjustment region and a second pull-in limit region defined in the first pull-in limit region and contained an origin of the two dimensional coordinates, and determinating the pull-in of a color shown by the color signal into a white color defined as the origin of the two dimensional coordinates; and a gain adjustment circuit for adjusting the gain of the amplification circuit, to thereby pull-in the color shown by the color signal determined the pull-in into the origin of the two dimensional coordinates.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, a camera apparatus according to a preferred embodiments of the present invention will be explained with reference to the accompanying drawings.

Figure 3:
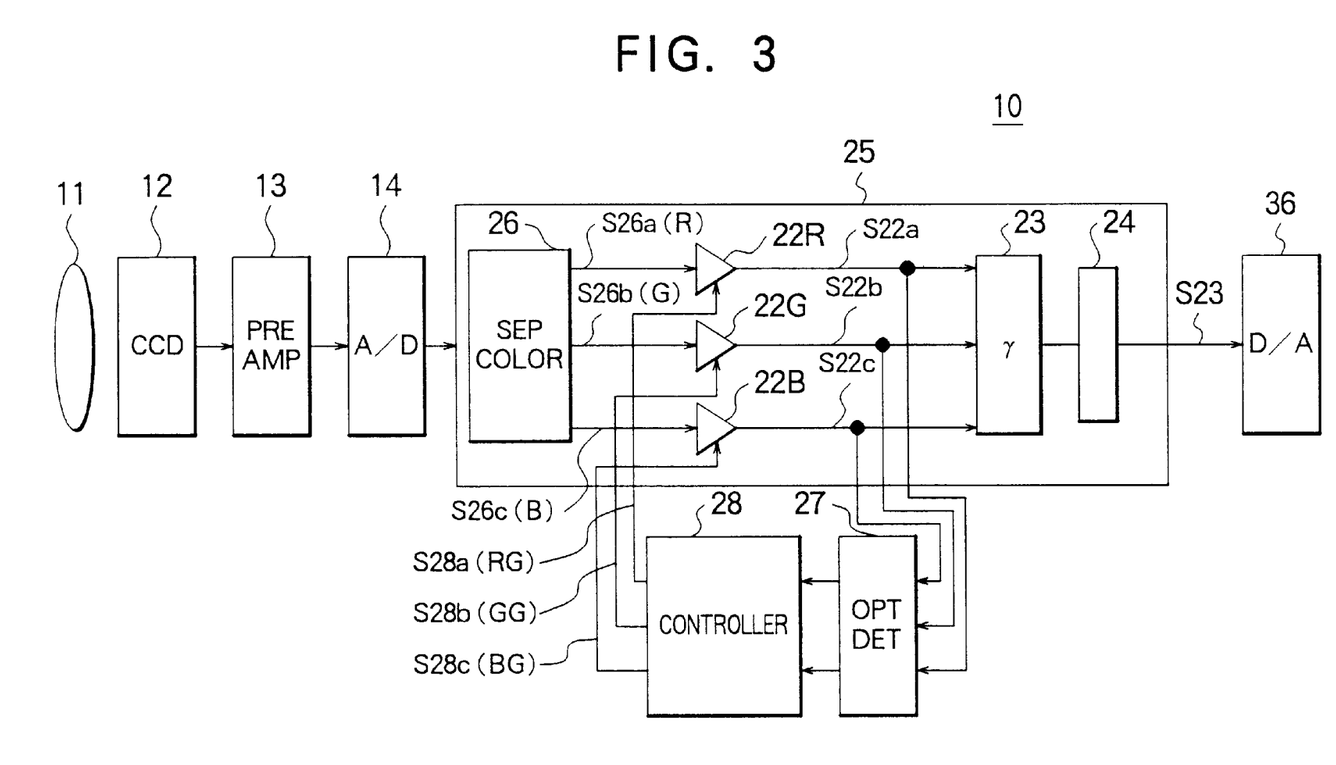
FIG. 3 is a diagram of a system configuration of a camera apparatus of an embodiment of the present invention.

FIG. 3 is a configuration diagram of a system of a camera apparatus 10 of the present embodiment.

As shown in FIG. 3, the camera apparatus 10 comprises, for example, a lens 11, an imaging device 12, a preamplifier 13, an analog to digital (A/D) converter 14, a digital signal processing circuit 25, an optical detector 27, a controller 28 and a digital to analog (D/A) converter 36.

The lens 11 projects an image of an object to be imaged (not illustrated) on an image surface of the imaging device 12.

The imaging device 12 comprises, for example, a CCD, converts an image passed through the lens 11 to an electric signal and applies it to the preamplifier 13 as an image signal.

The preamplifier 13 sample-holds the image signal from the imaging device 12 and extracts necessary data, and carries out a gain control to adjust it to an appropriate level. The output signal of the preamplifier 13 is output to the A/D converter 14.

The A/D converter 14 converts the output signal form the preamplifier 13 from an analog signal to a digital signal and outputs the digital signal to the digital signal processing circuit 25.

The digital signal processing circuit 25 comprises, for example as shown in FIG. 3, a primary-colors separator 26, white balance amplifiers 22R, 22G and 22B, a gamma (γ) corrector 23 and a color difference matrix device 24.

The primary-colors separator 26 separates the digital signal from the A/D converter 14 to an R signal S26a, G signal S26b and B signal S26c which are primary-colors signals of red (R), green (G) and blue (B), and outputs these signals to the white balance amplifiers 22R, 22G and 22B, respectively.

The white balance amplifier 22R adjusts the gain of the R signal S26a from the primary-colors separator 26 based on an R gain signal S28a from the controller 28 and outputs it as an R signal S22a to the gamma (γ) corrector 23.

The white balance amplifier 22G adjusts the gain of the G signal S26b from the primary-colors separator 26 based on a G gain signal S28b from the controller 28 and outputs is as a G signal S22b to the gamma (γ) corrector 23.

The white balance amplifier 22B adjusts the gain of the B signal S26c from the primary-colors separator 26 based on a B gain signal S28c from the controller 28 and outputs it as a B signal S22c to the gamma (γ) corrector 23.

Namely, the amplifying rates (gains) of the white balance amplifiers 22R, 22G and 22B are adjusted in order that the ratio of the R signal S22a, G signal S22b and B signal S22c becomes equal based on the R gain signal S28a, G gain signal S28b and B gain signal S28c from the controller 28 and the white balance processing is performed in the white balance amplifiers 22R, 22G and 22B.

The γ corrector 23 corrects gamma (γ) based on the R signal S22a, G signal S22b and B signal S22c. A color difference matrix processing is then carried out in the color difference matrix device 24 and a picture image signal S23 is generated by combining it with a luminance (Y) signal which is not illustrated.

The picture image signal S23 is, through a compressing processing, etc., recorded/stored in a recording medium such as a magnetic recording tape and an magneto-optical tape, or transferred in a wired or wireless form/method.

Figure 4:
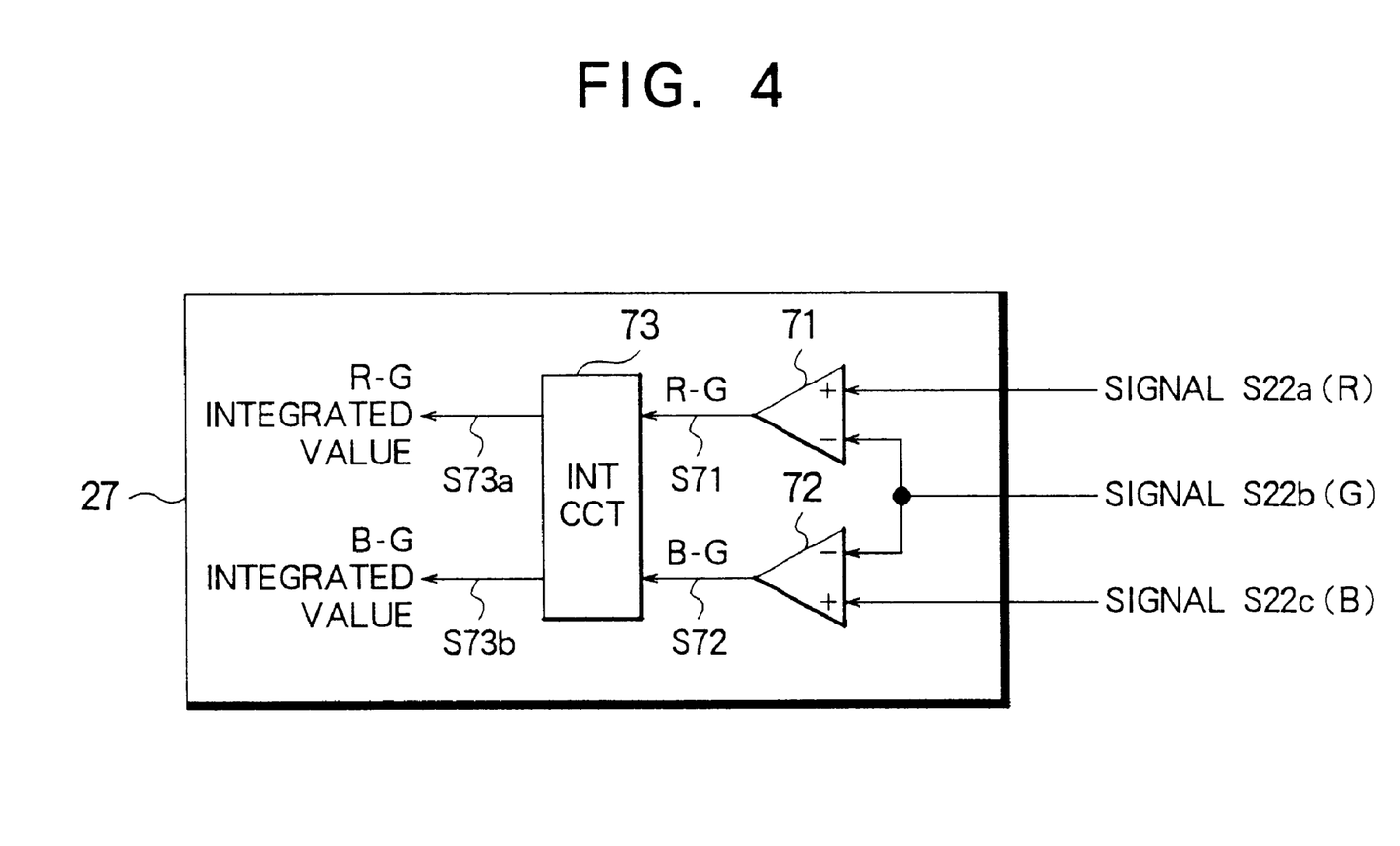
FIG. 4 is a diagram of a circuit configuration of an optical detector shown in FIG. 3.

FIG. 4 is a diagram of a circuit configuration of an optical detector 27.

As shown in FIG. 4, the optical detector 27 comprises, for example, subtractors 71 and 72 and an integrating circuit 73.

The subtractor 71 subtracts the G signal S22b from the R signal S22a and outputs an (R-G) signal S71 to the integrating circuit 73.

The subtractor 72 subtracts the G signal S22b from the B signal S22c and outputs a (B-G) signal S72 to the integrating circuit 73.

Figure 5:
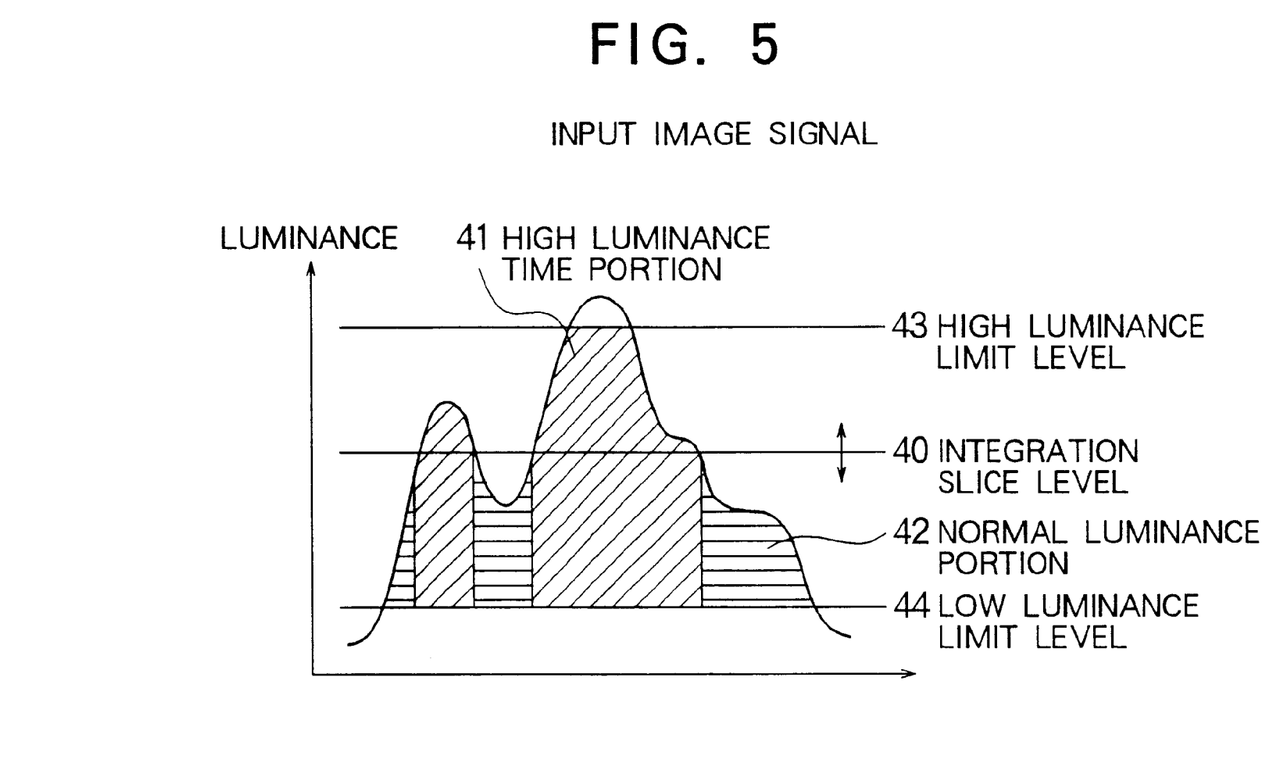
FIG. 5 is a graph of an image signal processed by an integrating circuit shown in FIG. 4.

The integrating circuit 73 has, as shown in FIG. 5, a different integration range which is divided into a high luminance portion 41 and a normal luminance portion 42 by an integration slice level 40 based on a luminance level. In the high luminance portion 41, only (R-G) signal S71 and (B-G) signal S72 having higher luminance than the integration slice level 40 are integrated, while only the (R-G) signal S71 and (B-G) signal S72 having a lower integration slice level 40 are integrated in the normal luminance portion 42.

Note that it determines that the level is saturated when the luminance is extremely high, accordingly it does not integrate signals having a high luminance limit level of 43 or more. Also, signals having too low luminance is regarded as noise and signals having luminance of less than a low luminance limit level 44 are not integrated.

As explained above, there are a variety of limiters and special processings are performed in the optical detector 27 in order that the automatic white balance processing is not erroneously operated in the cases with special conditions (for example, condition of complete mono-color). The optical detector 27 then outputs the (R-G) integrated value signal S73a and the (B-G) integrated value signal S73b obtained by integrating in different integration range of the high luminance portion/normal luminance portion for every field to the controller 28.

Note that although integration was carried out after generating the (R-G) signal S71 and the (B-G) signal S72 from the R signal S22a, the G signal S22b and B signal S22c in the present example, integration of the R signal S22a, the G signal S22b and B signal S22c can be carried out before generating the (R-G) signal S71 and the (B-G) signal S72 from the R signal S22a, the G signal S22b and B signal S22c.

Figure 6:
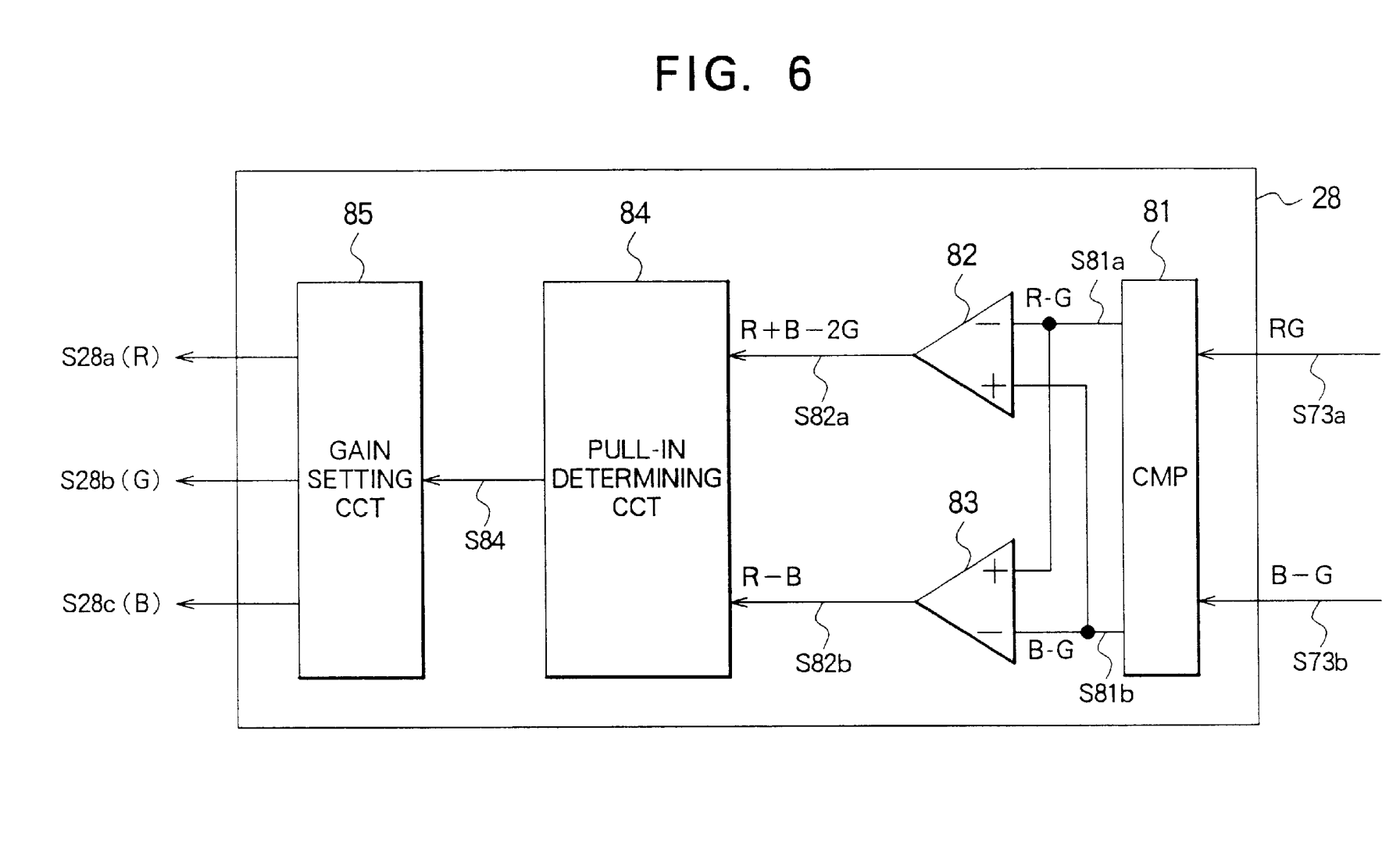
FIG. 6 is a block diagram of controller functions shown in FIG. 3.

FIG. 6 is a block diagram of the controller 28.

The controller 28 comprises, for example as shown in FIG. 6, a comparator 81, an adder 82, a subtractor 83, a pull-in determining circuit 84 and a gain setting circuit 85.

The comparator 81 compares the (R-G) integrated value signal S73a and the (B-G) integrated value signal S73b of the high luminance portions with the (R-G) integrated value signal S73a and the (B-G) integrated value signal S73b in the normal luminance portions input from the optical detector 27, and outputs the signals closer to 0 as the (R-G) integrated value signal S81a and the (B-G) integrated value signal S81b to the adder 82 and the subtractor 83.

Figure 7A:
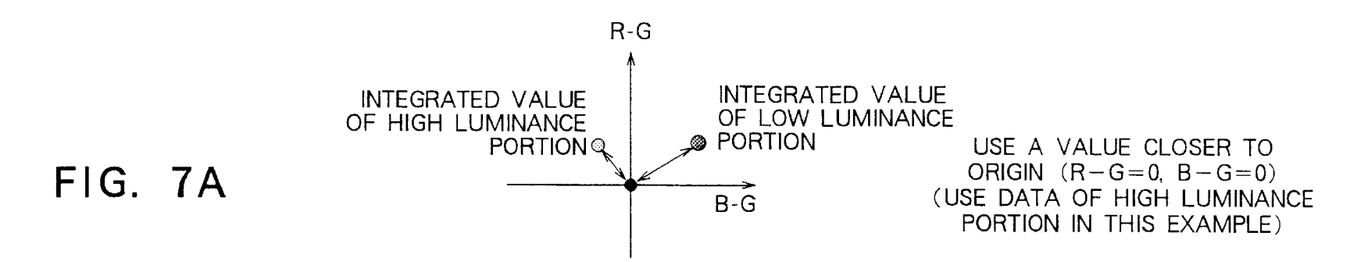
FIGS. 7A and 7B are views for explaining a processing in a comparator shown in FIG. 6.
Figure 7B:
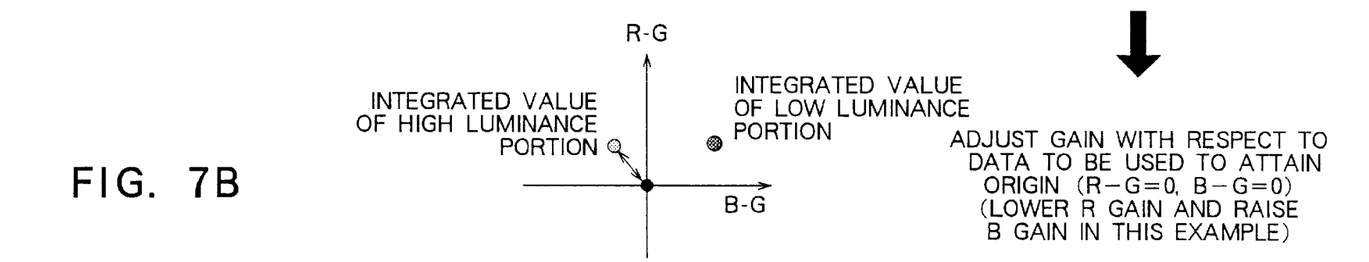

For example in the case shown in FIG. 7A, the (R-G) integrated value signal and the (B-G) integrated value signal of the high luminance portions are output respectively as an (R-G) integrated value signal S81a and (B-G) integrated value signal S81b to the adder 82 and subtractor 83.

The adder 82 adds the (R-G) integrated value signal S81a and (B-G) integrated value signal S81b to generate an (R+B−2G) integrated value signal S82a and outputs the same to the pull-in determining circuit 84.

The subtractor 83 subtracts the (B-G) integrated value signal S81b from the (R-G) integrated value signal S81a to generate an (R-B) integrated value signal S82b and outputs the same to the pull-in determining circuit 84.

The pull-in determining circuit 84 determines whether the position (color) in the (R+B−2G, R-B) coordinates indicated by the (R+B−2G) integrated value signal S82a and (R-B) integrated value signal S82b exists between two reference levels which are defined inside the pull-in limit region. When determined that it exists in the region, a pull-in instruction signal S84 indicating within the pull-in region is output to a gain setting circuit 85, while when determined that it does not exist in the region, an pull-in instruction signal S84 indicating the outside of the pull-in region is output to the gain setting circuit 85.

Figure 8A:
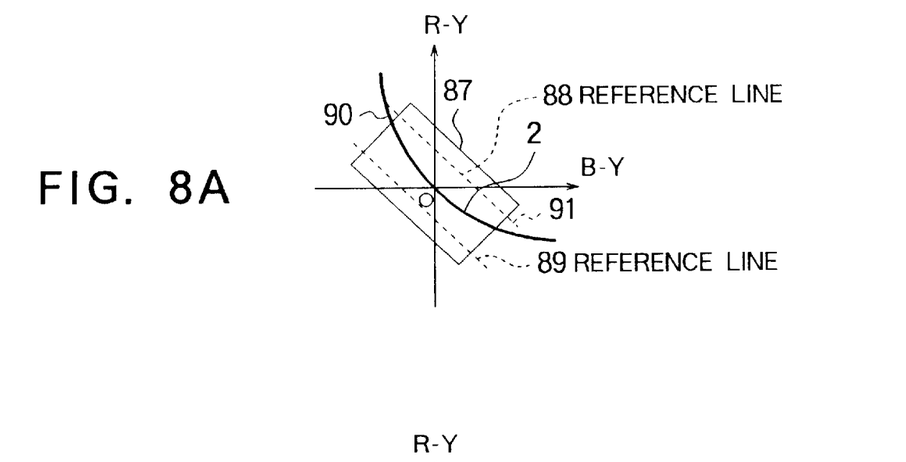
FIGS. 8A to 8C are graphs for explaining a processing in a pull-in determining circuit shown in FIG. 6.
Figure 8B:
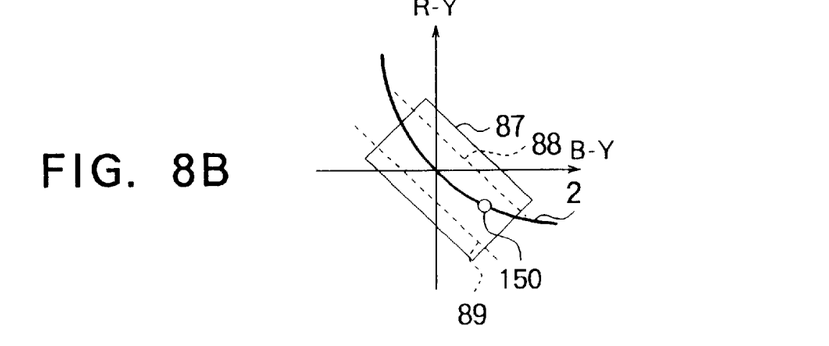
Figure 8C:
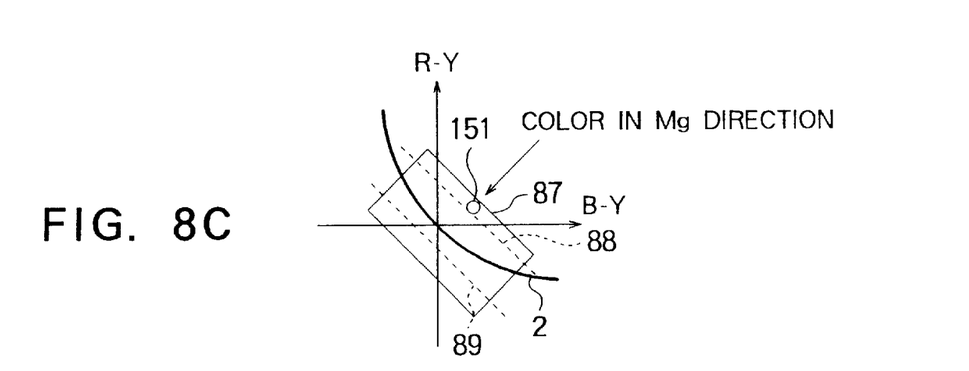

The gain setting circuit 85 performs the automatic white balance processing when the pull-in instruction signal S84 indicating within the pull-in region is input and generates an R gain signal S28a, G gain signal S28b and B gain signal S28c for pulling in a color indicated by the (R+B−2G) integrated value signal S82a and the (R-B) integrated value signal S82b to the origin "0" shown in FIGS. 8A, 8B and 8C.

Figure 9:
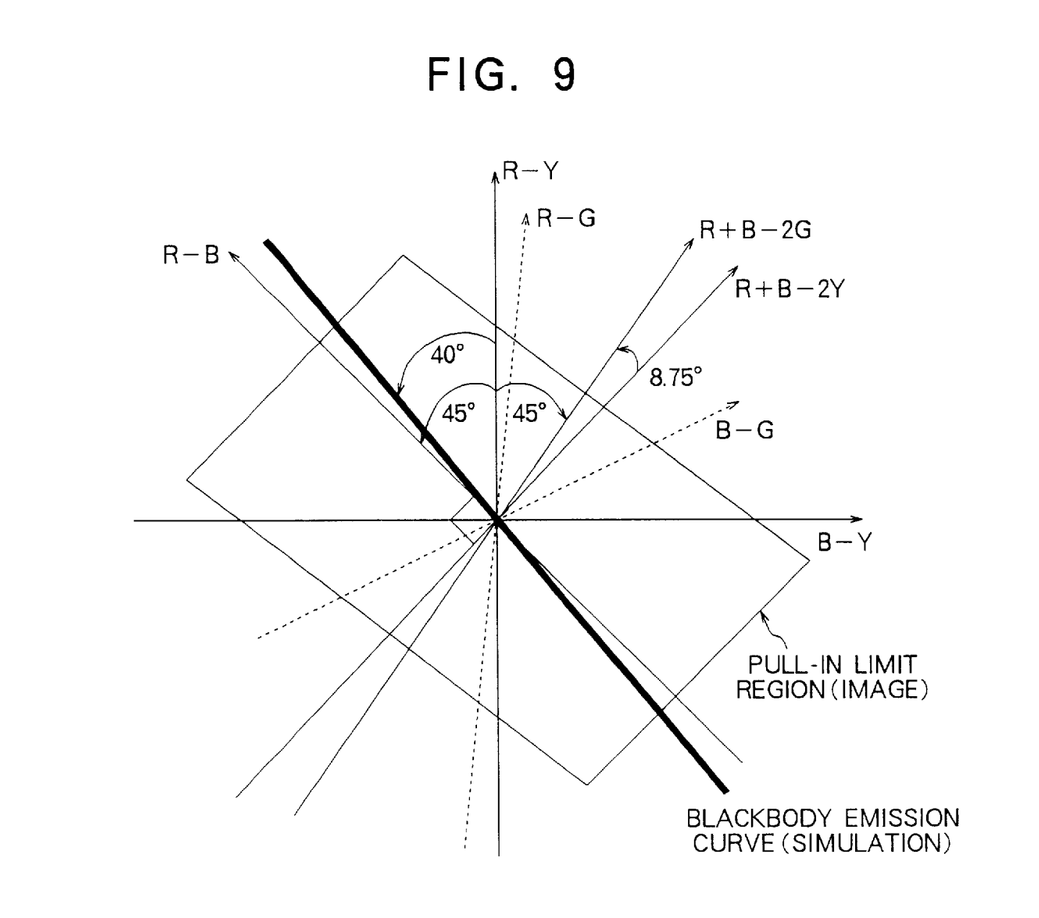
FIG. 9 is a view for explaining relationships between coordinates of (B-Y, R-Y) and coordinates of (R+B–2G, R-B)

Note that the (B-Y, R-Y) coordinates is used for the illustration in FIGS. 8A, 8B and 8C. Here, there is a relationship as shown in FIG. 9 between the (B-Y, R-Y) coordinates and the (R+B−2G, R-B) coordinates. That is, the (R+B−2G, R-B) coordinates is the same as the (B-Y, R-Y) coordinates being rotated around the origin "0" by 45° in the counterclockwise. To express it by a vector, there are relationships of [vector(R-B)=vector(R-Y)−vector(B-Y)]and [vector(R+B−2G)=119×vector(R-Y)+81×vector(B-Y)].

Below, processings in the pull-in determining circuit 84 will be explained in detail.

The pull-in determining circuit 84 determines where in the (B-Y, R-Y) coordinates shown in FIGS. 8A, 8B and 8C a position (color) in the (R+B−2G, R-B) coordinates indicated by the (R+B−2G) integrated value signal S82a and (R-B) integrated value signal S82b exists. When the position exists inside the pull-in limit region 87 as a first pull-in limit region and between the reference lines 88 and 89, the pull-in instruction signal S84 indicating within the pull-in region is output to the gain setting circuit 85. While in other cases, the pull-in instruction signal S84 indicating the outside of the: pull-in region is output to the gain setting circuit 85.

Here, a second pull-in limit region is defined by a short side of the pull-in limit region 87 and the reference lines 88 and 89.

The reason for setting the pull-in limit region 87 in this way is to prevent an erroneous operation of pulling in colors which are not originally white into white.

Here, the pull-in limit region 87 is a rectangular shape whose long sides are inclined by 135° to the (B-Y) axis in the counterclockwise direction.

Note that the blackbody emission curve is a curve passing through the origin "0" and the tangental line thereof at the origin "0" is inclined exactly by 135° to the (B-Y) axis in the counterclockwise direction. Accordingly, the tangental line of the blackbody emission curve at the origin "0" and the long side of the pull-in limit region 87 are in parallel.

Since the white color on the objective image changes along with the blackbody emission curve in accordance with the change of the color temperature in the sensed image, it is ideal that the automatic white balance processing is performed only to the color on the blackbody emission curve.

However, to determine correctly whether or not a position (color) indicated by the (R+B−2G) integrated value signal S82a and (R-B) integrated value signal S82b exists on the blackbody emission curve, a very large volume of program would be required.

Therefore, normally, the rectangular shape pull-in limit region 87 is approximately used. The automatic white balance processing is performed unconditionally to an objective color when the color is inside the pull-in limit region 87.

Further, in the present embodiment, reference lines 88 and 89 in parallel with the tangental line of the blackbody emission curve at the origin "0" are provided inside the square pull-in limit region 87, as shown in FIG. 8A, and a condition for performing the automatic white balance processing is set to the objective color to exist between the reference lines 88 and 89.

Accordingly, as shown in FIG. 8B, when the objective color 150 is positioned inside the pull-in limit region 87 in the (B-Y, R-Y) coordinates and also is positioned between the reference lines 88 and 89, the pull-in determining circuit 84 outputs the pull-in instruction signal S84 indicating within the pull-in region to the gain setting circuit 85.

On the other hand, as shown in FIG. 8C, when the objective color 151 is positioned inside the pull-in limit region 87 in the (B-Y, R-Y) coordinates but is positioned outside the space between the reference lines 88 and 89, the pull-in determining circuit 84, while pulling in, outputs the pull-in instruction signal S84 indicating the outside of the pull-in region to the gain setting circuit 85 when the color comes across the reference lines 88 and 89.

Here, the reference line 89 limits pulling in from the direction where, for example, a color such as magenta is positioned in the upper right quadrant. It is expressed in the formula below in the (B-Y, R-Y) coordinates.

$$(R\text{-}Y)=-(B\text{-}Y)+\alpha \qquad (1)$$

Namely, the reference line 89 is a straight line in the (B-Y, R-Y) coordinates having a gradient of −1 and the point of intersection with the (R-Y) axis is (0, β).

Also, the point (0, β) is positioned higher than the point of intersection of the lower long side of the pull-in limit region 87 and the (R-Y) axis. Furthermore, the reference line 89 is positioned lower than the point of intersection of the blackbody emission curve 2, a curve being positioned symmetrically with respect to the straight line of (R-Y)=−(B-Y) and the short side of the pull-in limit region 87.

In the present embodiment, β is −18(h), where h represents a hexa-decimal expression.

The reference line 88 limits pulling in from the direction where, for example, a color such as green is positioned in the lower bottom quadrant. It is expressed by the formula below.

$$(R\text{-}Y)=-(B\text{-}Y)+\beta \qquad (2)$$

Namely, the reference line 88 is a straight line in the (B-Y, R-Y) coordinates having a gradient of −1 and the point of intersection with the (R-Y) axis is (0, β).

Also, the point (0, α) is positioned lower than the point of intersection of the upper long side of the pull-in limit region 87 and the (R-Y) axis. Furthermore, the reference line 88 is positioned higher than intersections 90 and 91 with the short side of the pull-in limit region 87.

In the present embodiment, α is +18(h).

Below, the operation of the camera apparatus 10 shown in FIG. 3 will be explained.

Figure 10:
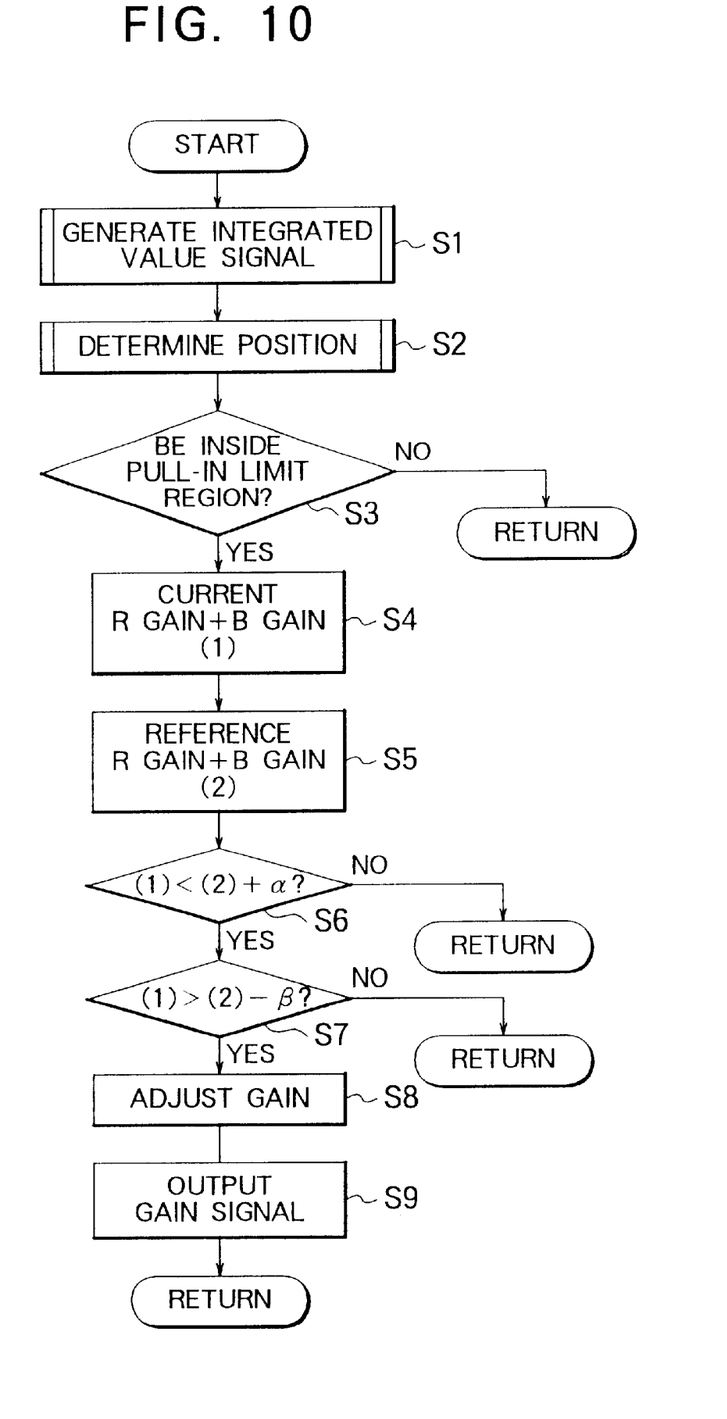
FIG. 10 is a flow chart for explaining a processing in the camera apparatus shown in FIG. 3.

FIG. 10 is a flow chart for explaining the operation of the camera apparatus shown in FIG. 3.

Step S1: A sensed image of an object formed on the imaging device 12 via the lens 11 is gain-controlled by the preamplifier 13, and converted to a digital signal by the A/D converter 14. The digital signal is separated into R, G and B signals by the primary-colors separator 26 and respectively output to the white balance amplifiers 22R, 22G and 22B. Then the R signal S22a, G signal S22b and B signal S22c amplified by the white balance amplifiers 22R, 22G and 22B are output to the optical detector 27. The optical detector 27 generates the (R-G) integrated value signal S73a and (R-G) integrated value signal S73b based on the R signal S22a, G signal S22b and B signal S22c and outputs the same to the controller 28.

Step S2: The controller 28 shown in FIG. 6 generates the (R+B−2G) integrated value signal S82a and (R-B) integrated value signal S82b based on the (R-G) integrated value signal S73a and (R-G) integrated value signal S73b, and the position of the objective color in the (R+B−2G, R-B) coordinates is specified.

Step S3: The pull-in determining circuit 84 in the controller 28 determines whether or not the position of the objective color specified in the step S2 is inside the pull-in limit region 87 shown in FIG. 8. When determined that it exists inside the pull-in limit region 87, a processing of step S4 is carried out, while when determined that it does not exists inside the pull-in limit region 87, the pull-in instruction signal S84 indicating the outside of the pull-in region is output to the gain setting circuit 85 shown in FIG. 6 and the pull-in processing is not carried out.

In this embodiment, the processing in the controller 28 is (actually) carried out using the (R+B−2G, R-B) coordinates for simplifying calculation, however, the processings are substantially the same as the processing using the pull-in limit region 87 and reference lines 88 and 89 in the (B-Y, R-Y) coordinates explained referring to FIG. 8.

Step S4: An [R gain+B gain] with respect to the position specified in the step S2 is obtained in the pull-in determining circuit 84.

Step S5: An [R gain+B gain] of reference lines 88 and 89 shown in FIG. 8 are obtained in the pull-in determining circuit 84.

Step S6: The pull-in determining circuit 84 compares the [R gain+B gain] obtained in the step S4 with the value of [R gain+B gain] of the reference lines 88 and 89 obtained in the step S5 being added α, and determines whether the latter value is larger or not. When the pull-in determining circuit 84 determines that the latter is larger, that is when the position specified in the step S2 is lower than the reference line 88 shown in FIG. 8, the precessing of the step S7 is carried out, while in other cases, the pull-in instruction signal S84 indicating the outside of the pull-in region is output to the gain setting circuit 85 shown in FIG. 6, and the pulling in processing is not carried out.

Step S7: The pull-in determining circuit 84 compares the [R gain+B gain] obtained in the step S4 with the value of [R gain+B gain] of the reference lines 88 and 89 obtained in the step S5 being subtracted β, and determines whether the former is larger or not. When the pull-in determining circuit 84 determines that the former is larger, that is when the position specified in the step S2 is higher than the reference line 89 shown in FIG. 8, the pull-in instruction signal S84 indicating within the pull-in region is output to the gain setting circuit 85 shown in FIG. 6 and the processing of the step S8 is carried out. While in the case when determined that the former value is not larger, the pull-in instruction signal S84 indicating the outside of the pull-in region is output to the gain setting circuit 85 shown in FIG. 6, and the pull-in processing is not carried out.

Steps S8 and S9: When the pull-in instruction signal S84 indicating the outside of the pull-in region is input to the gain setting circuit 85, the automatic white balance processing is performed. In order that the color indicated by the (R+B−2G) integrated value signal S82a and (R-B) integrated value signal S82b is pulled in to the origin "0" shown in FIG. 8, the R gain signal S28a, G gain signal S28b and B gain signal S28c for adjusting the R gain, G gain and B gain are generated, which are respectively output to the white balance amplifiers 22R, 22G and 22B shown in FIG. 3 after being converted to a predetermined data form. Due to this, the R signal S22a, G signal S22b and B signal S22c are feedback-controlled, so that the picture image signal S23 to which an appropriate white balance processing is performed is generated.

As explained above, according to the camera apparatus 10, the objective color is pulled in to the origin "0" which indicates white of an acchromatic color only when it exists inside the pull-in limit region 87 in the (B-Y, R-Y) coordinates and exists between the reference lines 88 and 89 at the same time. Therefore, compared with the case where only the pull-in limit region 87 is used, it is possible to prevent performing the white balance processing to colors other than white more correctly. Thus, the picture quality of the sensed image can be improved.

Also, according to the camera apparatus 10, since the reference lines 88 and 89 are simple straight lines, the processing can be realized with a small volume of program.

Further, according to the camera apparatus 10, by adjusting α and β of the reference lines 88 and 89, the difference of the gains due to the not unified characteristics of the imaging device 12 can be absorbed. Accordingly, a high quality sensed image can be provided steadily.

Note that the present invention is not limited to the above embodiments.

For example, the reference lines 88 and 89 are straight lines being parallel to the long side of the pull-in limit region 87 in the above embodiment, however, as long as they are defined to be inside the pull-in limit region 87, straight lines not being parallel with the long side of the pull-in limit region, lines with curves or curves can be used. At this time, patterns of the reference lines are decided by relationships of the processing time required by the white balance processing and the required quality.

Figure 11A:
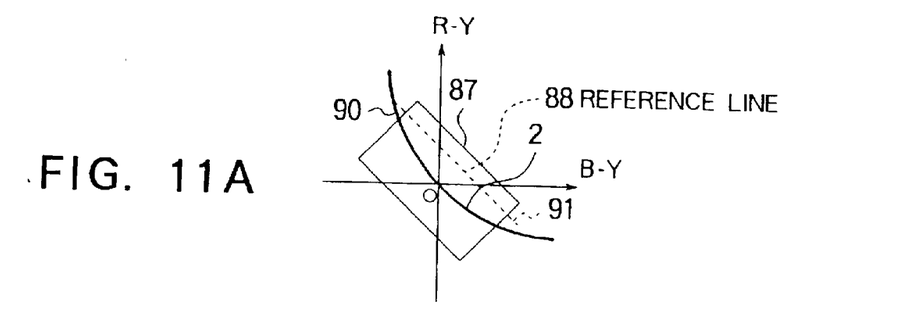
FIGS. 11A to 11B are views for explaining a case when one reference line is used in other embodiments of the present invention.
Figure 11B:
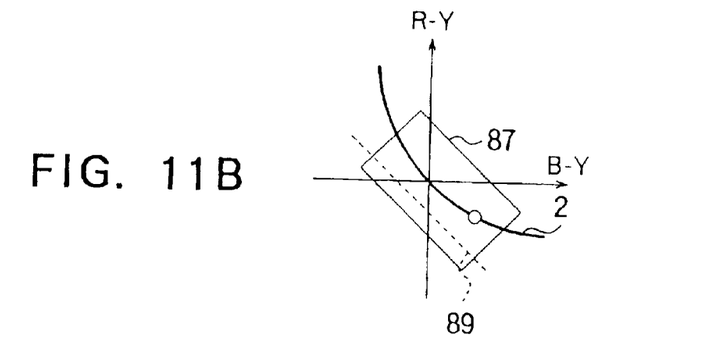

Also, in the above embodiment, a case of providing two reference lines was explained, however, it is possible to provide only the reference line 88 as shown in FIG. 11A or to provide only the reference line 89 as shown in FIG. 11B depending on conditions.

Figure 12:
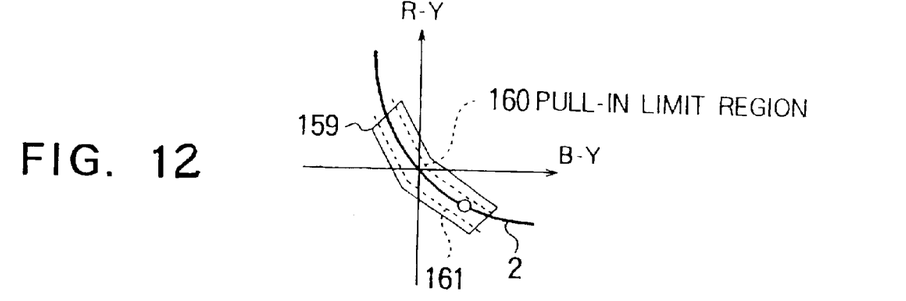
FIG. 12 is a view for explaining a case when a pull-in limit region which is combination of a plurality of rectangles is used in another embodiments of the present invention.

Furthermore, a shape rectangle is used as the pull-in limit region 87 in the above embodiment, however, for example as shown in FIG. 12, the reference lines 160 and 161 can be provided in the pull-in limit region 159 which is combination of a plurality of rectangles.

As explained, according to the color signal processing circuit, method of the same and the camera apparatus of the present invention, it is possible to correctly prevent performing the white balance processing to colors other than white. Therefore, picture quality of sensed image can be improved.

Also, according to the color signal processing circuit and the camera apparatus of the present invention, the processing can be realized with a small volume program by using a square shape for a first pull-in limit region and straight lines for a second pull-in limit region.

Also, according to the color signal processing apparatus, method of the same and the camera apparatus of the present invention, by adjusting the second pull-in limit region, difference of gains due to the not unified characteristics of the solid imaging device can be eliminated.

What is claimed is:

1. A color signal processing circuit, comprising:

an input for supplying a color signal formed of red, green and blue color signals that are color-separated from an image signal produced by a solid-state imaging device;

an amplifier having respective gains for amplifying said red, green and blue color signals;

a pull-in determining circuit for first determining if the color signal, as projected onto a two-dimensional coordinate system, is positioned within a first pull-in region and if it is determined that said color signal is positioned within said first pull-in region, then second determining if the color signal is positioned within a second pull-in region, said first pull-in region containing said second pull-in region, and both said first and second pull-in regions containing the origin of said two-dimensional coordinate system which represents a white color, said pull-in determining circuit additionally determining the pull-in for said color signal to be white-balanced and processed as a white color; and a gain adjustment circuit for adjusting the respective gains of said amplifier so as to pull in the projected color signal toward said origin.

2. A color signal processing circuit according to claim 1 further comprising an integration circuit for integrating the color signal; and wherein the pull-in determining circuit determines if the integrated color signal, projected in the two-dimensional coordinate system, is positioned within the first pull-in region and the second pull-in region, and determines the amount of pull-in for said integrated color signal to be white balanced, and wherein the gain adjustment circuit adjusts the gains of the amplifier to thereby pull-in the projected integrated color signal toward said origin of the two-dimensional coordinate system.

3. A color signal processing circuit according to claim 2, wherein the image signal admits of field intervals, and the integration circuit integrates the color signal every field.

4. A color signal processing circuit according to claim 2, wherein the integrated color signal represents a color that is varied to another color which is displaced from a blackbody emission curve in the two-dimensional coordinate system in response to a change of a color temperature, and wherein the first pull-in region is a rectangular shape having a longitudinal direction parallel to a line tangential to a blackbody emission curve at the origin.

5. A color signal processing circuit according to claim 1, wherein the color signal represents a color that is varied to another color which is displaced from a blackbody emission curve in the two-dimensional coordinate system in response to a change of a color temperature.

6. A color signal processing circuit according to claim 1, wherein the solid-state imaging device is a charge coupled device.

7. A color signal processing circuit comprising:

an input for supplying a color signal formed of red, green and blue color signals that are color-separated from an image signal produced by a solid-state imaging device;

an amplifier having respective gains for amplifying said red, green and blue color signals;

a pull-in determining circuit for determining if the color signal, as projected onto a two-dimensional coordinate system, is positioned within a first pull-in region and within a second pull-in region, said first pull-in region containing said second pull-in region, and both said first and second pull-in regions containing the origin of said two-dimensional coordinate system which represents a white color, said pull-in determining circuit additionally determining the pull-in for said color signal to be white-balanced and processed as a white color; and a gain adjustment circuit for adjusting the respective gains of said amplifier so as to pull in the projected color signal toward said origin;

wherein the two-dimensional coordinate system is defined by a (R+B−2G) axis, where R is the red color signal, B is the blue color signal and G is the green color signal, and a (R-B) axis.

8. A color signal processing circuit according to claim 7, further comprising an integration circuit for integrating the color signal; and wherein the image signal admits of field intervals and the integration circuit integrates an (R-G) color signal and a (B-C) color signal every field to generate an (R-C) integrated color signal and a (B-G) integrated color signal, and wherein the pull-in determining circuit uses the (R-G) integrated color signal and the (B-G) integrated color signal to produce an (R-B) integrated color signal and an (R+B−2G) integrated color signal, and said pull-in determining circuit determines if a color represented by the (R-B) integrated color signal and the (R+B−2G) integrated color signal is positioned within the first pull-in region and the second pull-in region, and determines the amount of pull-in for the color represented by the integrated color signal to be white balanced, and wherein the gain adjustment circuit adjusts the gains of the amplifier to thereby pull-in the color represented by the integrated color signal toward the origin of the two-dimensional coordinate system.

9. A color signal processing circuit according to claim 7, wherein the first pull-in region is a first rectangular shape which contains a blackbody emission curve in the two-dimensional coordinate system, which curve passes through the origin, and wherein the second pull-in region is a second rectangular shape smaller than the first pull-in region and also containing the blackbody emission curve.

10. A color signal processing method comprising the steps of:

supplying a color signal formed of red, green and blue color signals that are color-separated from an image signal produced by a solid-state imaging device;

amplifying said red, green and blue color signals with respective gains;

determining first if the color signal, as projected onto a two-dimensional coordinate system, is positioned within a first pull-in region and if it is determined that said color signal is positioned within said pull-in region, then second determining if the color signal is positioned within a second pull-in region, said first pull-in region containing said second pull-in region, and both said first and second pull-in regions containing the origin of said two-dimensional coordinate system which represents a white color, and determining the pull-in for said color signal to be white-balanced and processed as a white color; and adjusting said respective gains so as to pull in the projected color signal toward said origin.

11. A color signal processing method according to claim 10 further comprising the step of integrating the color signal; and wherein it is determined if the integrated color signal, projected in the two-dimensional coordinate system, is positioned within the first pull-in region and the second pull-in region, and the amount of pull-in for said integrated color signal to be white balanced is determined, and wherein the respective gains are adjusted to thereby pull-in the projected integrated color signal toward said origin of the two-dimensional coordinate system.

12. A color signal processing method according to claim 11, wherein the image signal admits of field intervals, and the color signal is integrated every field.

13. A color signal processing method according to claim 11, wherein the integrated color signal represents a color that is varied to another color which is displaced from a blackbody emission curve in the two-dimensional coordinate system in response to a change of a color temperature, and wherein the first pull-in region is a rectangular shape having a longitudinal direction parallel to a line tangential to a blackbody emission curve at the origin.

14. A color signal processing method according to claim 10, wherein the color signal represents a color that is varied to another color which is displaced from a blackbody emission curve in the two-dimensional coordinate system in response to a change of a color temperature.

15. A color signal processing method, comprising the steps of:

supplying a color signal formed of red, green and blue color signals that are color-separated from an image signal produced by a solid-state imaging device;

amplifying said red, green and blue color signals with respective gains;

determining if the color signal, as projected onto a two-dimensional coordinate system, is positioned within a first pull-in region and within a second pull-in region, said first pull-in region containing said second pull-in region, and both said first and second pull-in regions containing the origin of said two-dimensional coordinate system which represents a white color, and determining the pull-in for said color signal to be white-balanced and processed as a white color; and adjusting said respective gains so as to pull in the projected color signal toward said origin;

wherein the two-dimensional coordinate system is defined by a (R+B−2G) axis, where R is the red color signal, B is the blue color signal and G is the green color signal, and a (R-B) axis.

16. A color signal processing method according to claim 15, wherein the image signal admits of field intervals and an (R-G) color signal and a (B-G) color signal are integrated every field to generate an (R-G) integrated color signal and a (B-G) integrated color signal, and wherein the (R-G) integrated color signal and the (B-G) integrated color signal are used to produce an (R-B) integrated color signal and an (R+B−2G) integrated color signal, and it is determined if a color represented by the (R-B) integrated color signal and the (R+B−2G) integrated color signal is positioned within the first pull-in region and the second pull-in region, and the amount of pull-in is determined for the color represented by the integrated color signal to be white balanced, and wherein the respective gains are adjusted to thereby pull-in the color represented by the integrated color signal toward the origin of the two-dimensional coordinate system.

17. A color signal processing method according to claim 15 wherein the first pull-in region is a first rectangular shape which contains a blackbody emission curve in the two-dimensional coordinate system, which curve passes through the origin, and wherein the second pull-in region is a second rectangular shape smaller than the first pull-in region, and also containing the blackbody emission curve.

18. Camera apparatus for comprising:

imaging means including a plurality of solid-state imaging elements for generating an analog image signal of an object;

an A/D converter for converting the analog image signal to a digital image signal;

a color separation circuit for separating the digital image signal to a red color signal, a green color signal and a blue color signal;

an amplifier having respective gains for amplifying said red, green and blue color signals;

a pull-in determining circuit for first determining if all color signals, as projected onto a two-dimensional coordinate system, is positioned within a first pull-in region and if it is determined that said color signal is positioned within said first pull-in region, then second determining if the color signal is positioned within a second pull-in region, said first pull-in region containing said second pull-in region, and both said first and second pull-in regions containing the origin of said two-dimensional coordinate system which represents a white color, said pull-in determining circuit additionally determining the pull-in for said color signal to be white-balanced and processed as a white color; and a gain adjustment circuit for adjusting the respective gains of said amplifier so as to pull in the projected color signal toward said origin.

19. Camera apparatus according to claim 18 further comprising an integration circuit for integrating all color signals; and wherein the pull-in determining circuit determines if the integrated color signal, projected in the two-dimensional coordinate system, is positioned within the first pull-in region and the second pull-in region, and determines the amount of pull-in for said integrated color signal to be white balanced, and wherein the gain adjustment circuit adjusts the gains of the amplifier to thereby pull-in the projected integrated color signal toward said origin of the two-dimensional coordinate system.

20. Camera apparatus according to claim 19, wherein the digital image signal admits of field intervals, and the integration circuit integrates all color signals every field.

21. Camera apparatus according to claim 19, wherein the integrated color signal represents a color that is varied to another color which is displaced from a blackbody emission curve in the two-dimensional coordinate system in response to a change of a color temperature, and wherein the first pull-in region is a rectangular shape having a longitudinal direction parallel to a line tangential to a blackbody emission curve at the origin.

22. Camera apparatus according to claim 18, further comprising a gamma correction circuit for gamma correcting the red, green and blue color signals, a color changing circuit for changing the gamma-corrected image signal to color difference signals of (R-Y) and (B-Y), where R represents a red color signal, B represents a blue color signal and Y represents a luminance signal, and a D/A converting circuit for converting the digital color difference signals to analog difference signals.

23. Camera apparatus according to claim 18, wherein the combined color signal represents a color that is varied to another color which is displaced from a blackbody emission curve in the two-dimensional coordinate system in response to a change of a color temperature.

24. A color signal processing circuit according to claim 18, wherein the solid-state imaging device is a charge coupled device.

25. Camera apparatus comprising:

imaging means including a plurality of solid-state imaging elements for generating an analog image signal of an object;

an A/D converter for converting the analog image signal to a digital image signal;

a color separation circuit for separating the digital image signal to a red color signal, a green color signal and a blue color signal;

an amplifier having respective gains for amplifying said red, green and blue color signals;

a pull-in determining circuit for determining if the color signal, as projected onto a two-dimensional coordinate system, is positioned within a first pull-in region and within a second pull-in region, said first pull-in region containing said second pull-in region, and both said first and second pull-in regions containing the origin of said two-dimensional coordinate system which represents a white color, said pull-in determining circuit additionally determining the pull-in for said color signal to be white-balanced and processed as a white color; and a gain adjustment circuit for adjusting the respective gains of said amplifier so as to pull in the projected color signal toward said origin;

wherein the two-dimensional coordinate system is defined by a (R+B−2G) axis, where R is the red color signal, B is the blue color signal and G is the green color signal, and a (R-B) axis.

26. Camera apparatus according to claim 25, wherein the digital image signal admits of field intervals and an integration circuit integrates an (R-G) color signal and a (B-G) color signal every field to generate an (R-G) integrated color signal and a (B-G) integrated color signal, and wherein the pull-in determining circuit uses the (R-G) integrated color signal and the (B-G) integrated color signal to produce an (R-B) integrated color signal and an (R+B−2G) integrated color signal, and said pull-in determining circuit determines if a color represented by the (R-B) integrated color signal and the (R+B−2G) integrated color signal is positioned within the first pull-in region and the second pull-in region, and determines the amount of pull-in for the color represented by the integrated color signal to be white balanced, and wherein the gain adjustment circuit adjusts the gains of the amplifier to thereby pull-in the color represented by the integrated color signal toward the origin of the two-dimensional coordinate system.

27. Camera apparatus according to claim 25, wherein the first pull-in region is a first rectangular shape which contains a blackbody emission curve in the two-dimensional coordinate system, which curve passes through the origin, and wherein the second pull-in region is a second rectangular shape smaller than the first pull-in region, and also containing the blackbody emission curve.

* * * * *